Nov. 8, 1927. 1,648,457
H. KERSHAW
LIQUID DELIVERING SYSTEM
Filed Aug. 1, 1923 7 Sheets-Sheet 2

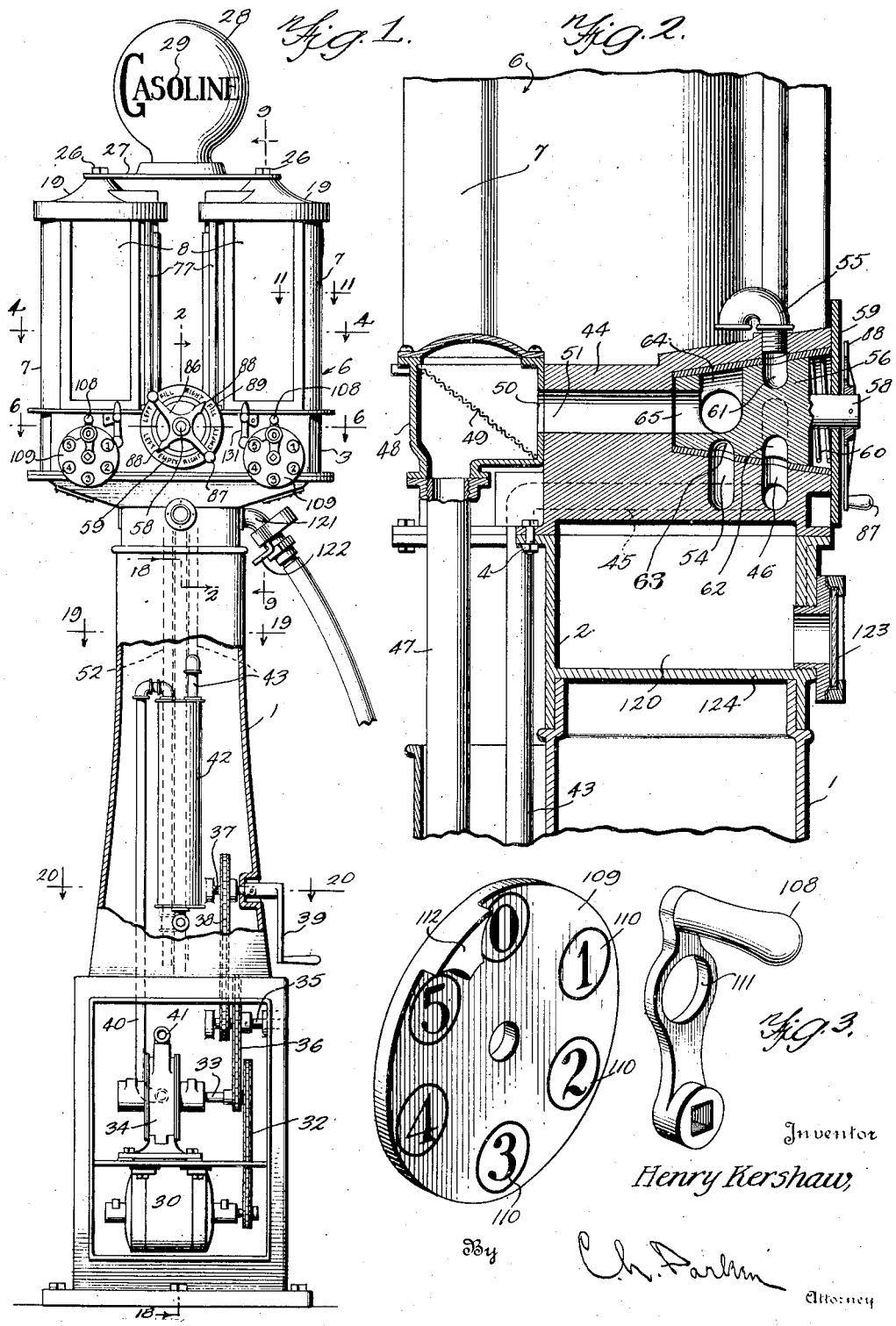

Inventor
Henry Kershaw,
By
Attorney

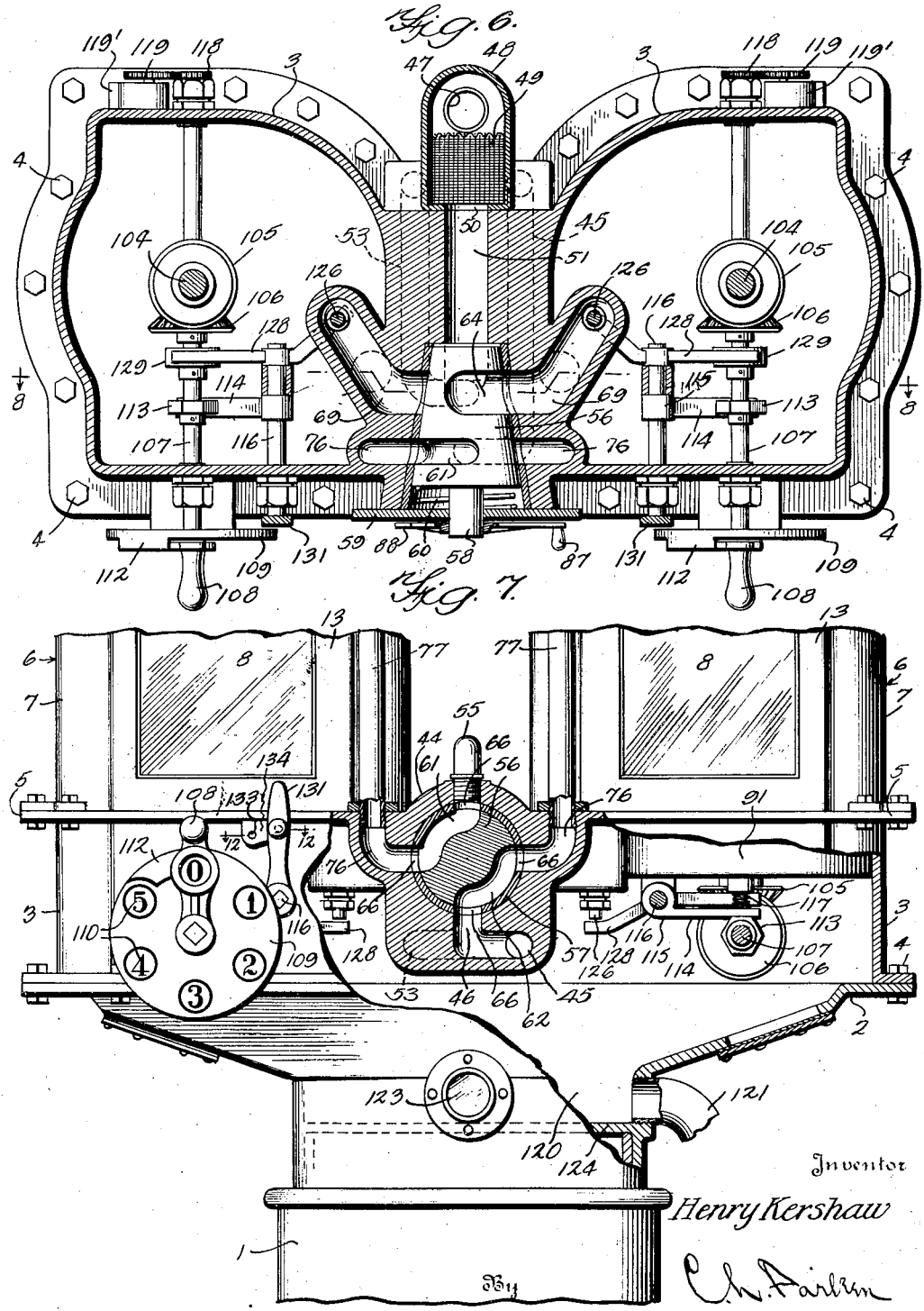

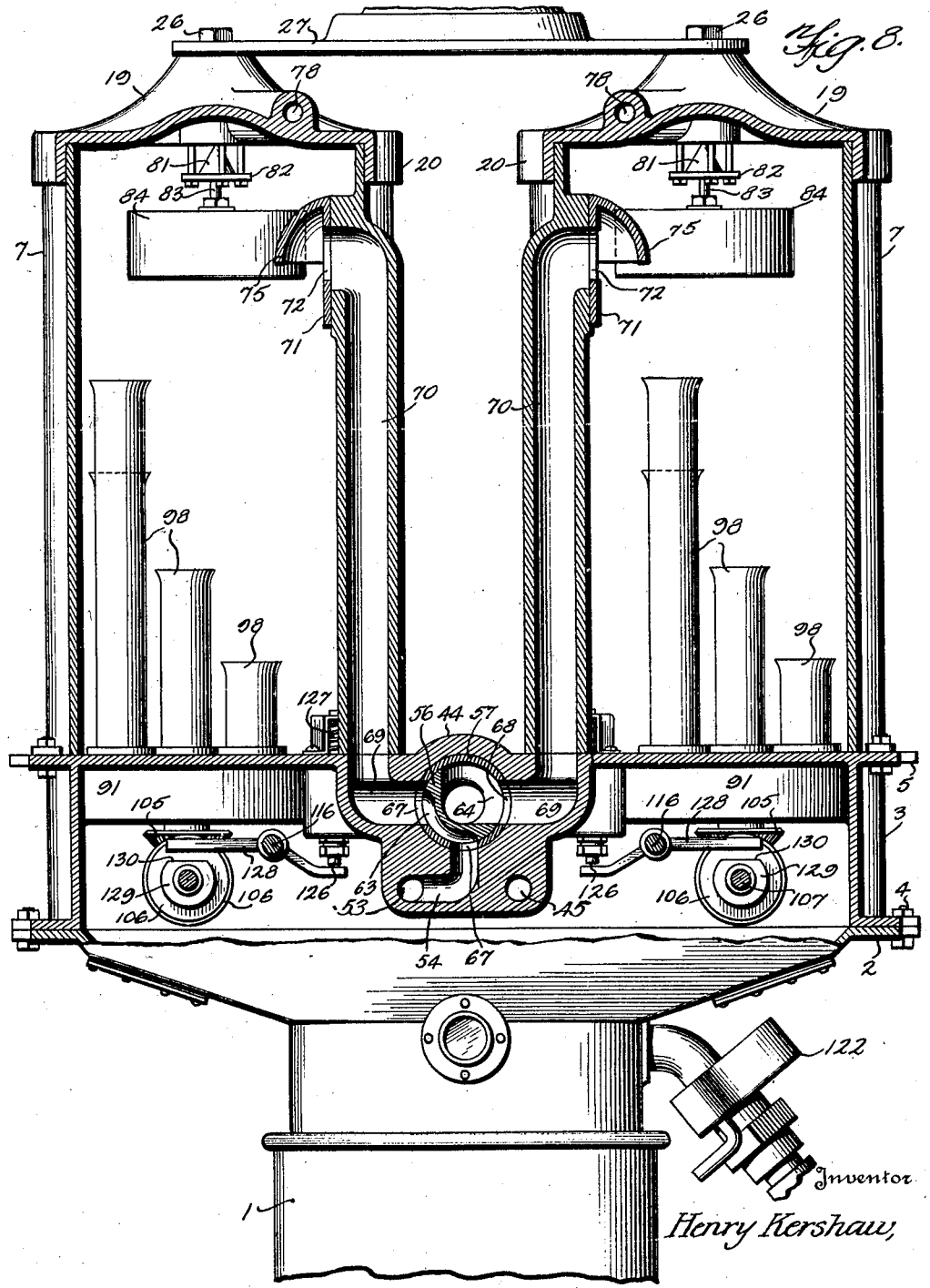

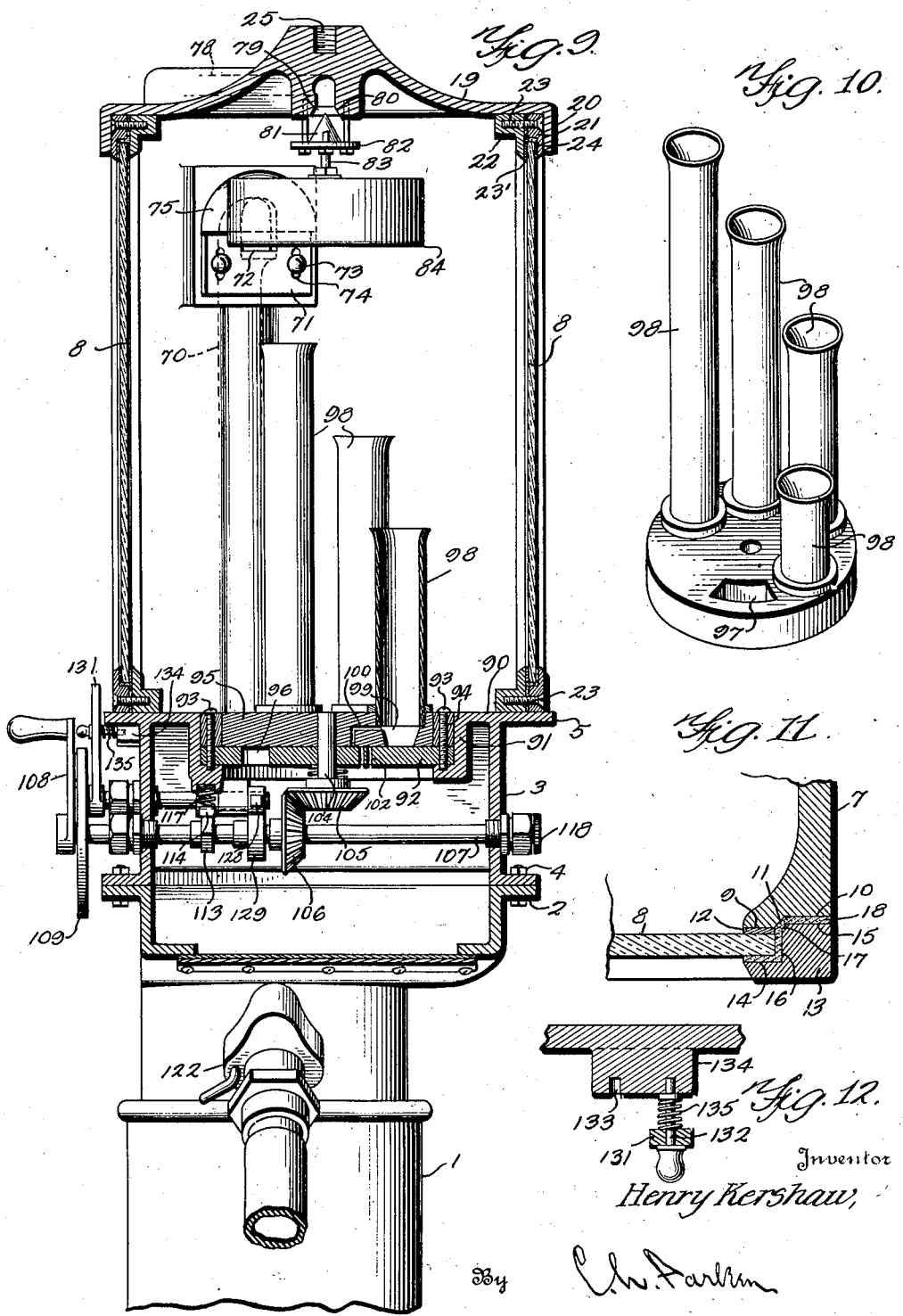

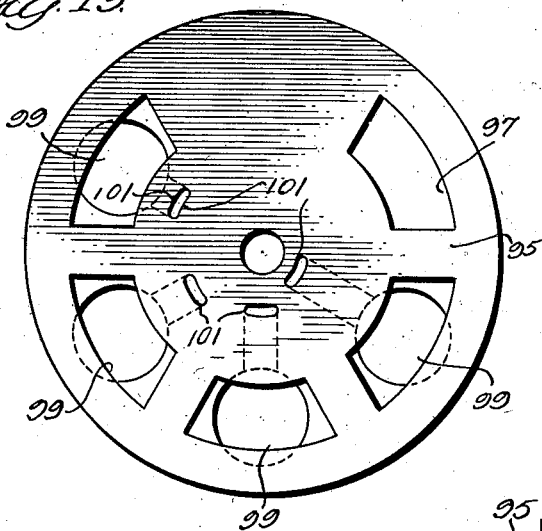
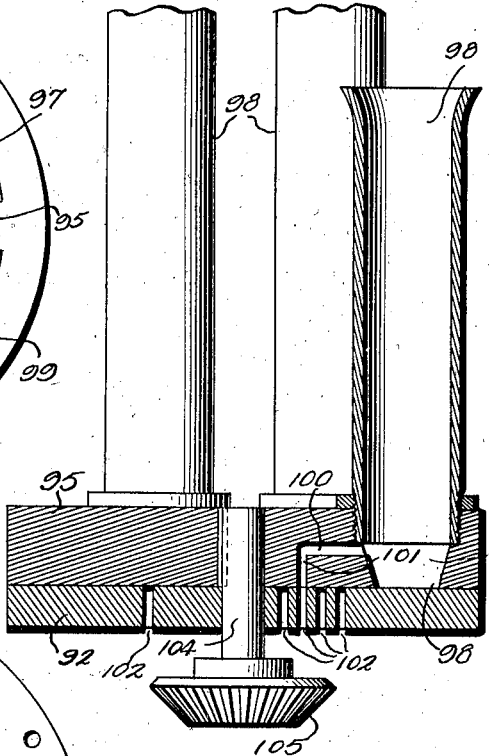
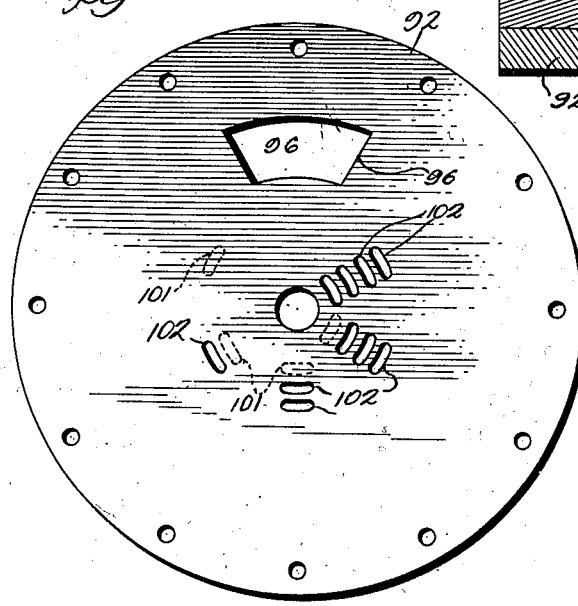
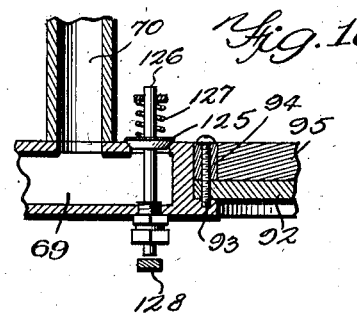

Nov. 8, 1927.

H. KERSHAW

LIQUID DELIVERING SYSTEM

Filed Aug. 1, 1923   7 Sheets-Sheet 7

1,648,457

Inventor
Henry Kershaw,

By
Attorney

Patented Nov. 8, 1927.

1,648,457

UNITED STATES PATENT OFFICE.

HENRY KERSHAW, OF NEWARK, NEW JERSEY, ASSIGNOR, BY MESNE ASSIGNMENTS, TO VISIBLE PUMP COMPANY, OF NEWARK, NEW JERSEY, A CORPORATION OF NEW JERSEY.

LIQUID-DELIVERING SYSTEM.

Application filed August 1, 1923. Serial No. 655,071.

This invention relates to liquid delivering systems, and more particularly to systems for delivering liquid fuel or the like, in predetermined quantities.

The invention herein described and claimed is an improvement over the invention described and claimed in the patent to William I. McCrumb and myself, No. 1,448,804, granted March 20, 1923.

The present device is generally similar to the construction disclosed in said Letters Patent and consists of a pair of tanks, a supply pipe, a suction pipe, and a valve arranged in a casing between the two tanks and adapted to connect either of said tanks to the suction pipe and the supply pipe at the same time.

An object of the present invention is the provision of improved means for delivering desired quantities of fuel from the tank.

A further object is the provision of an auxiliary valve by means of which the contents of the tank may be returned to the source of supply.

In the accompanying drawings, I have shown one embodiment of the invention. In this showing:

Figure 1 is a front elevation, parts being shown in section,

Figure 2 is a vertical sectional view on line 2—2 of Figure 1,

Figure 3 is a detail view of a portion of the discharge mechanism,

Figure 6 is a horizontal sectional view on line 6—6 of Figure 1,

Figure 4:
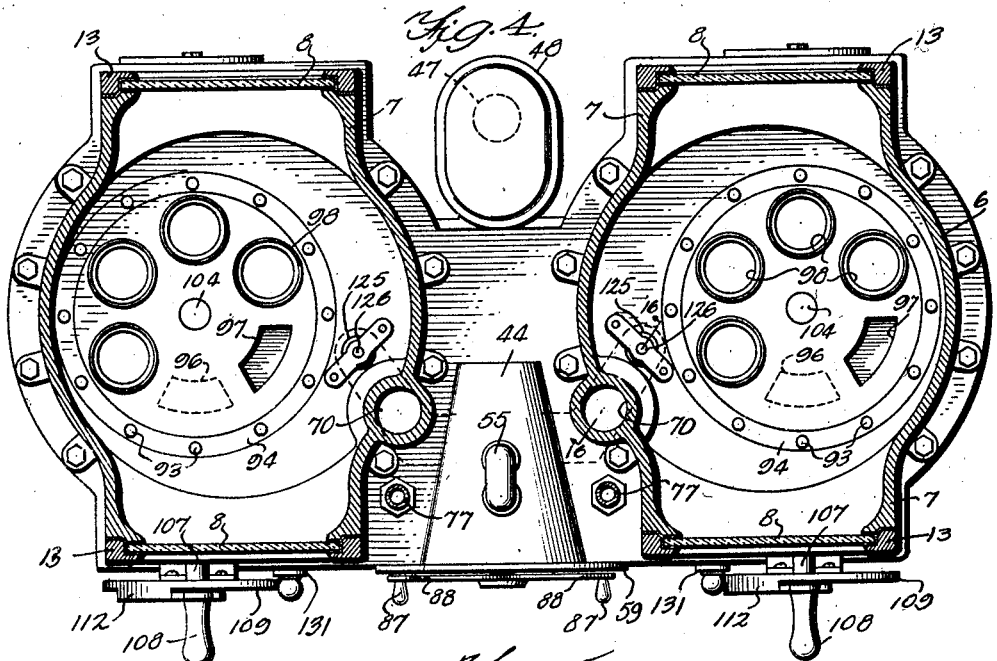
Figure 4 is a horizontal sectional view on line 4—4 of Figure 1.
Figure 17:
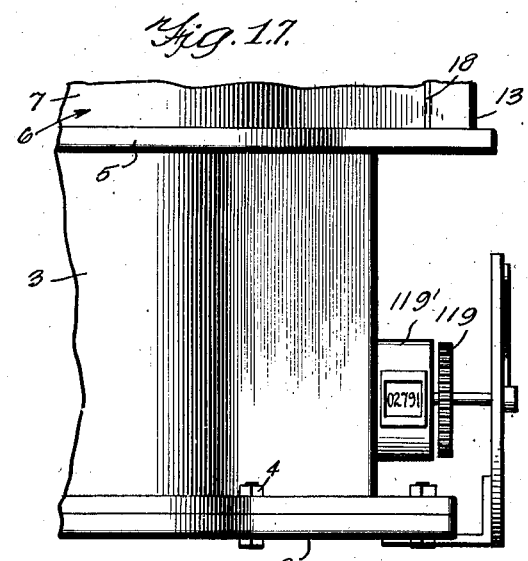
Figure 18:
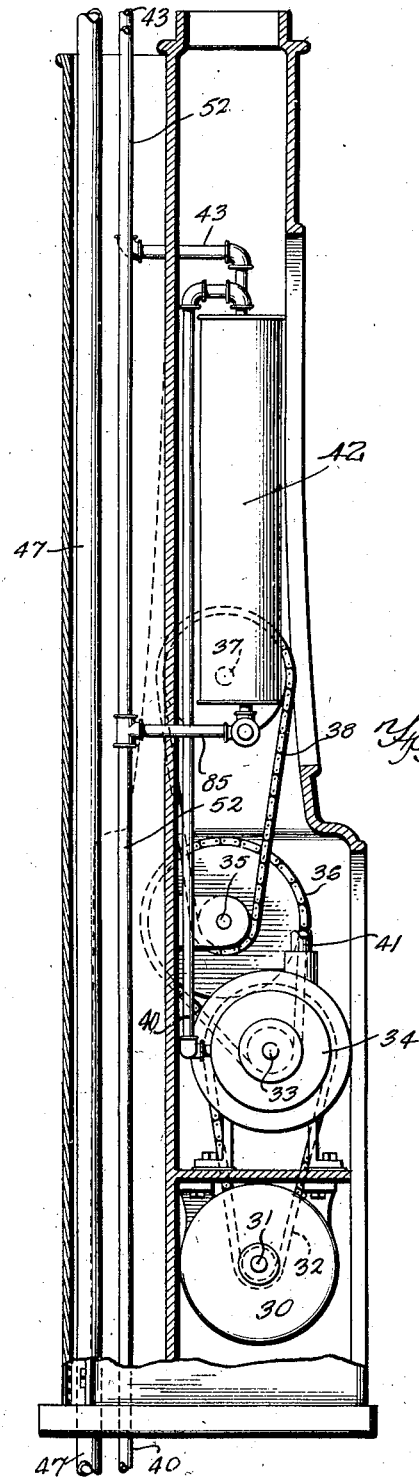
Figure 19:
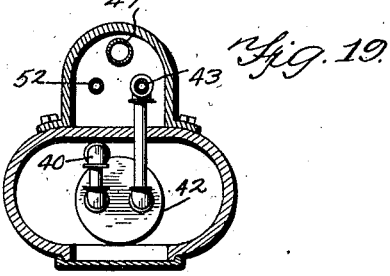
Figure 20:
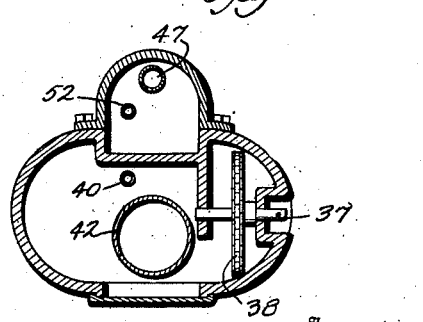

Figure 7 is an enlarged front elevation of a portion of the apparatus, parts being shown in section, Figure 8 is a vertical sectional view on line 8—8 of Figure 6, Figure 9 is a vertical sectional view on line 9—9 of Figure 1, Figure 10 is a detail perspective view of the discharge valve, Figure 11 is a detail sectional view on line 11—11 of Figure 1, Figure 12 is a similar view on line 12—12 of Figure 7, Figure 13 is a bottom plan view of the discharge valve, Figure 14 is a similar view of the valve seat, Figure 15 is a vertical sectional view of the discharge valve and seat on an enlarged scale, Figure 16 is a detail sectional view on line 16—16 of Figure 4, Figure 17 is a side elevation of a portion of the rear of one of the tanks showing the registering mechanism, Figure 18 is a vertical sectional view on line 18—18 of Figure 1, Figure 19 is a horizontal sectional view on line 19—19 of Figure 1, and, Figure 20 is a similar view on line 20—20 of Figure 1.

Referring to the drawings, the reference numeral 1 designates a base or support in the form of a pedestal upon which the tanks are adapted to be mounted. The upper end of the pedestal is provided with a flange 2 and a cylindrical member 3 is secured to this flange by means of bolts 4 or other suitable fastening elements. The cylindrical member is provided with a flange 5 at its upper end, to which the bottoms of the tanks are adapted to be secured. Each tank consists of a pair of side plates 6. As shown, these side plate are provided with curved portions arranged intermediate the ends of the plate and are further provided with parallel portions 7. The front and rear of the tanks is closed by plates 8 formed of glass or other transparent material, whereby the purchaser of fuel may see the amount of fuel contained in the tank. The manner in which the glass plates are secured to the side walls of the tanks is shown in detail in Figure 11 of the drawings. As shown, the edges of the side walls are provided with parallel portions 9 and 10 connected by a beveled or inclined portion 11. The glass plate rests upon the inner portion 9 of the edge and a gasket 12 is arranged between the plate and the edge of the side wall. A rectangular frame 13 is adapted to be arranged over the glass. As shown, this frame is provided with a pair of faces 14 and 15, parallel to each other and adapted to be arranged adjacent the faces 10 of the side wall and the outer face of the glass. These two faces are connected by a surface 16 substantially at right angles to them and a beveled portion 17, which is arranged adjacent the beveled portion 11 of the side wall when the frame is in position. A filling of cement 18 is arranged between the frame and the glass. This cement is preferably formed of a mixture of litharge and glycerine. Each of the tanks is provided with a top 19 having a peripheral flange 20, shaped to receive the upper edges of the side walls and the glass plates. As shown, a holding member 21 is arranged on the upper edge of the glass plates and this member is recessed to receive the upper edge of the glass. An inner member 22 is secured to the flange 20 by means of bolts 23 and extends downwardly beyond the upper edge of the glass on its inner side. A gasket 23' is arranged between the inner member and the inner surface of the glass, and a filling of cement 24 is arranged between the inner and outer members and between the outer member and the glass. The tops of the tanks are provided with centrally arranged threaded openings 25 adapted to receive bolts 26 passing through a cross member 27. This cross member serves to secure the tops of the tanks to each other and further serves as a support for a globe 28. This globe may be provided with a lamp (not shown) to be lighted at night and may be further provided with suitable indicia 29 to indicate the fact that gasoline or other motor fuel is sold.

A motor 30 is arranged in the base of the pedestal and this motor is provided with a shaft 31. A sprocket is arranged on the motor shaft adapted to receive a chain 32 passing over a sprocket on a fan shaft 33. The fan shaft is adapted to operate a suction fan 34. Means are provided for driving the fan by hand if the motor should get out of order. As shown, a shaft 35 is arranged within the pedestal above the fan shaft and is connected to the fan shaft by means of a chain 36 passing over sprockets on the two shafts. An operating shaft 37 is arranged above the shaft 35 and is adapted to drive it by means of a chain 38. The end of the operating shaft extends through an opening in the pedestal and is adapted to receive a crank or handle 39. A suction pipe 40 is connected to the fan and the fan is provided with an outlet 41. This outlet may be extended to any desired point where local ordinances prohibit the use of a suction fan having an outlet adjacent the fuel tank. The pipe 40 is connected to a condenser 42 and the upper end of the condenser is connected to a vacuum pipe 43, extending upwardly through the pedestal. A valve casing 44 is arranged within the cylindrical member 3 adjacent the bottom of the tanks and the vacuum pipe is connected to a passage 45, communicating with a port 46 in the valve casing. A fuel supply pipe 47 is connected to a tank or other source of supply arranged beneath the pedestal and extends upwardly through the pedestal to a filter chamber 48 arranged adjacent the bottom of the tanks. This filter chamber is provided with a screen 49 of foraminous material adapted to remove foreign material from the fuel. The fuel chamber is provided with an outlet 50 communicating with a passage 51 in the valve chamber. An overflow pipe 52 extends upwardly through the pedestal and is connected to a passage 53 arranged within the valve casing. The end of this passage extends upwardly, as at 54, and is arranged in the same transverse plane with the end of the passage 51. The valve casing is provided with a vent opening adapted to receive a vent tube 55, and this vent opening is arranged in the same transverse plane with the end 46 of the vacuum passage. A tapered valve member 56 is arranged within the valve casing and this member is provided with a sleeve 57 made of brass or other suitable material to prevent leakage. The valve is provided with a stem 58 extending through a suitable closure plate 59 and a spring 60 is arranged between the body portion of the valve and this plate to cause the valve to snugly engage its seat. The valve is provided with a pair of oppositely disposed passages 61 and 62 arranged in the transverse plane of the vent tube and the vacuum opening. It is further provided with a passage 63 arranged in the plane of the overflow pipe and an appreciably large passage 64 leading from the center to the exterior of the valve. This passage communicates with a central opening 65 which in turn communicates with the fuel passage 51 in the valve casing. The sleeve 57 is provided with a plurality of openings 66 arranged at opposite ends of the passages 61 and 62, and is likewise provided with openings 67 arranged at opposite ends of the passage 63. Adjacent the cut-out portion 64 of the valve, the sleeve is provided with an opening 68. The valve casing is provided with a pair of passages 69 arranged in the same transverse plane with the cut-out portion 64 of the valve and adapted to communicate therewith. The outer ends of these passages communicate with pipes 70 formed in the side plates of the tanks. The upper ends of these pipes open into the tanks and are provided with closure members 71 having suitable openings 72. These closure members are secured to the side walls of the tank by means of bolts or screws 73 passing through slots 74 in the closure members whereby the height of the opening 72 may be adjusted and the amount of fuel which will remain in the tank may be regulated. A suitable baffle plate 75 is carried by each of the closure members to direct the gasoline or other fuel downwardly into the tanks.

The valve casing is further provided with passages 76 arranged in the plane of the cut-out portions 61 and 62 of the valves and communicating with pipes 77. These pipes extend upwardly adjacent the tanks (see Figure 4) and communicate with passages 78 in the top plates 19. The inner ends of these passages communicate with the interior of the tanks, as at 79, (see Figure 9). A valve seat 80 is formed on the inner end of each of the passages and the passage is adapted to be closed by a valve 81 when the level of fuel within the tank reaches a certain point. As shown, this valve is supported in a cage 82 and is provided with a valve stem 83 carrying a float 84. The condenser 42 communicates with the overflow pipe 52 at its lower end by means of a pipe 85. The valve stem 58 is provided with an operating member 86 in the form of a spider having a pair of handles 87 and a pair of pointers or index members 88. These pointers are adapted to cooperate with suitable indicia 89 to indicate which of the tanks is being filled and which of the tanks is in condition to be emptied.

The bottom of each of the tanks is closed by a plate 90 carried by the cylindrical member 3, and each of these plates is provided with a downwardly projecting flange 91 adapted to receive and support a valve seat 92. The valve seat is secured to the flange by means of bolts 93, passing through a ring 94. A valve 95 in the form of a disk is adapted to cooperate with the valve seat 92. As shown, the valve seat is provided with an outlet opening 96. In the operation of the tanks, each tank is adapted to be filled with fuel and is adapted to hold a certain definite measure of fuel, such as 5 gallons. The capacity of the tank is regulated by adjusting the closure member 71. When the full quantity of fuel in the tank is to be emptied, the valve 95 is turned to bring the opening 96 of the valve seat in alinement with an opening 97 in the valve. When less than 5 gallons is to be discharged, the fuel above a certain level is discharged through one of a plurality of stand pipes 98 carried by the valve. As shown, these stand pipes are arranged over openings 99 in the valve, and when the valve is rotated on its seat to bring one of the openings in communication with the opening 96, the quantity of fuel above the top of the corresponding stand pipe is delivered through the opening 96. To deliver a small quantity of fuel, such as 1 gallon, the stand pipe extending the greatest distance into the tank is arranged over the outlet opening in the valve seat, and in the drawings I have shown four stand pipes to deliver 1, 2, 3, and 4 gallons respectively.

When any given quantity of fuel is to be delivered from the tank, it is necessary to discharge the fuel in the stand pipes of each lesser unit. For this purpose, the valve member 95 is provided with passages 100 communicating with the openings 99 and extending toward the center of the valve. The ends of the passages 100 extend downwardly, as at 101. These downwardly extending portions of the passages 100 are arranged concentrically and at different distances from the center of the valve member. The valve seat is provided with a plurality of sets of openings 102, arranged at distances from each other equal to the distance between the stand pipes 98 and arranged concentrically. As shown, the number of openings 102 increases progressively from 1 to 4, and the outer circle of openings is complete, the number of openings decreasing in each set from the center.

The valve member is provided with a stem 104, extending through the valve seat and carrying a beveled gear 105. This gear is adapted to mesh with a similar gear 106 mounted on a shaft 107 journaled in the walls of the cylindrical member 3. The forward end of the shaft is provided with a handle 108 shown in detail in Figure 3 of the drawings. A plate 109 is arranged on the shaft and is prevented from rotating by any suitable means. This plate is provided with suitable indicia 110 to indicate the position of the discharge valve and stand pipes. The handle is provided with a substantially cylindrical opening 111, whereby the indicia on the plate may be read. The plate is provided with a lug or projection 112 forming a stop to prevent the valve from being turned more than a complete revolution. A hexagonal nut 113 is arranged on the shaft and an arm 114 is adapted to bear against this nut. The arm is provided with a sleeve 115 on its inner end, surrounding a shaft 116 and is normally forced toward the nut by a spring 117. The rear end of the shaft 107 extends through the wall of the casing and is provided with a pinion 118 meshing with a pinion 119 on a suitable recording mechanism 119'.

The discharge valves deliver the fuel into a chamber 120 having an outlet opening in which a flexible hose 121 or other pipe may be arranged. As shown, the outlet pipe is provided with a hand control outlet valve 122. Adjacent the outlet pipe, the pedestal is provided with an opening adapted to be closed by a transparent plate 123, forming a peep hole to permit inspection of the interior of the chamber 120. The opening covered by the transparent plate 123 is similar to the opening in which the pipe 121 is connected and if desired, the pipe and transparent plate may be reversed whereby the pipe will be connected to the opening covered by the transparent plate 123 to deliver fuel. The chamber is separated from the pedestal by a transverse wall or partition 124.

When the tanks are to be emptied at the close of a day or for any other reason, it is essential that means be provided for discharging the fuel from the tanks without operating the registering mechanism 119'. For this purpose, I provide valves 125, arranged in the bottom of each tank, shown in detail in Figure 16 of the drawings. These valves communicate with the outer ends of the passages 69. The valves are carried by valve stems 126 and are normally retained in closed position by springs 127. The lower ends of the valve stems project through openings in the bottom of the passages 69 and are arranged adjacent rocking levers 128 carried by the shafts 116. Suitable means are provided for preventing rotation of the shafts 116 and rotation of the levers 128 except when the discharge valves are arranged in closed position. As shown, a cam 129 is arranged on the main valve shaft 107 and this cam is provided with a cut-away portion 130. The levers 128 are extended over the cams and the cams are adapted to prevent actuation of the levers except when the cam is in the position shown in Figure 8 of the drawings, with the discharge valve in closed position.

In operation, one tank is adapted to be connected to the supply pipe and the suction producing means at one time and the other tank is adapted to be connected to the overflow and the vent at the same time. With the valve in the position shown in Figure 8 of the drawings, the cut away portion 64 of the valve is in communication with the passage 69 at the right, leading to the right hand tank. At the same time (see Figure 7), the cut away portion 62 of the valve is in communication with the passage 76 at the right, connecting to the second pipe 77 of this tank. If the motor is operated to operate the fan and create suction, the air in the right hand tank is withdrawn and fuel is drawn into this tank. When the level of fuel is sufficiently high to raise the float 84, the valve 81 closes the end of the suction conduit and the flow of fuel is stopped. At the same time, (see Figures 7 and 8), the cut out portion 63 of the valve connects the pipe 70 of the left hand tank with the overflow pipe through the passages 53 and 54 and any fuel in the pipe 70 or in the tank above the lower edge of the opening 72 is returned to the source through the overflow pipe 52. The pipe 77 of the left hand tank is in communication with the vent pipe 66 through the passage 61 of the valve and if the discharge valve is opened, the contents of the left hand tank will flow into the chamber 120. By turning the valve 56 a half revolution, the cut out portions 61, 62, 63 and 64 will be reversed to connect the left hand tank to the suction producing means and the source of fuel and the right hand tank to the overflow pipe and the vent, as will be apparent.

Figure 5:
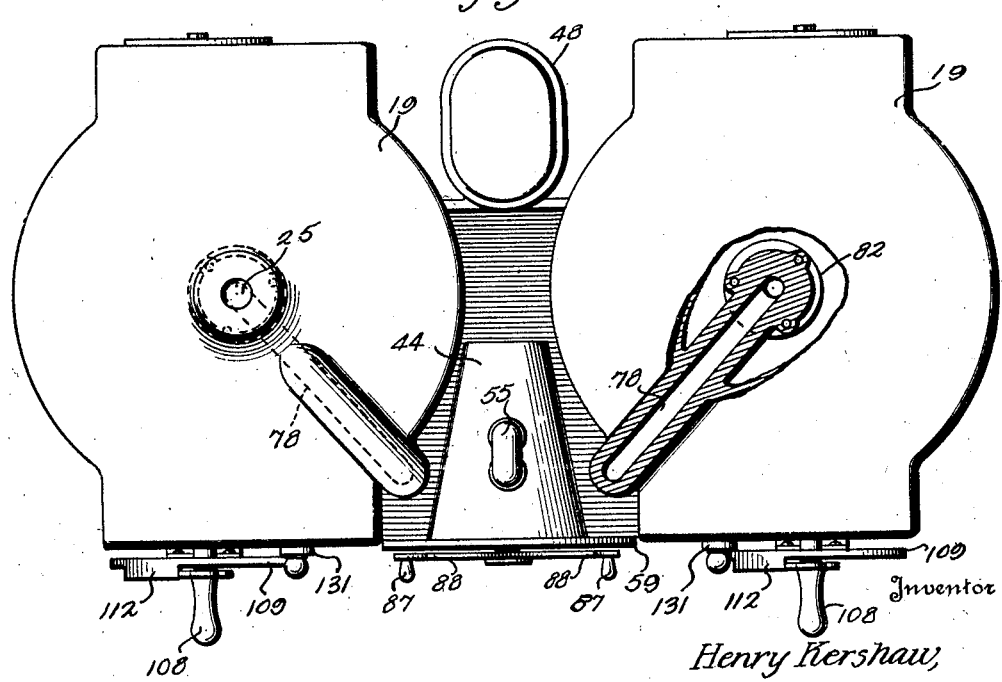
Figure 5 is a plan view, parts being shown in section.

To discharge the fuel from the tank that is in condition to be emptied, the valve 95 is rotated on its seat by means of the handle 108. To discharge the entire contents of the tank, the valve is rotated until the passages 96 and 97 are in communication with each other. If less than the entire contents of the tank is to be discharged, the valve handle 108 is rotated until the opening 111 is arranged over the corresponding figure. When the valve handle is arranged with the opening 111 over any of the figures other than the figure 5, the corresponding stand pipe is arranged over the opening 96. The fuel above the level of the stand pipe will then be delivered through the top of the pipe to the opening 96 of the valve plate and thence into the chamber 120. As stated, it is necessary to empty the stand pipes corresponding to lesser units of fuel when fuel is delivered through any of the stand pipes or through the opening 97. Referring to Figures 13 and 14 of the drawings, it will be seen that the downwardly extending portions 101 of the passages 100 are spaced less distance from the center of the valve member for increasing quantities of fuel. In other words, the downwardly extending portion of the stand pipe of greatest length and designed to deliver a single unit of fuel, such as 1 gallon, is arranged at the greatest distance from the valve stem 104, and the downwardly extending portion of the passage communicating with the stand pipe designed to deliver the greatest quantity of fuel, such as 4 gallons, is arranged closest to the valve stem. When the valve is turned to deliver 1 gallon of fuel, none of the passages 101 are in communication with the openings 102 in the valve seat 92. Upon further revolution of the valve to deliver 2 gallons of fuel, the passage connected to the longer stand pipe or the outer passage, communicates with the outer opening in the first set of openings and the longest stand pipe is emptied. When the valve is moved to the next position to deliver 3 gallons of fuel, the outer passage communicates with the outer opening of the next set and the next passage in a counter-clockwise direction in Figure 13 of the drawings communicates with the second opening 102 of the first set. It will be seen that each time the unit of fuel to be delivered is increased, all of the stand pipes designed to deliver a lesser quantity of fuel are brought into communication with one of the openings 102. After the fuel has been delivered into the chamber 120, it is dispensed into the fuel tank of a motor vehicle or to any other desired destination through the flexible pipe 121 in the usual manner by opening the valve 122. The number of units of fuel delivered through each tank is recorded by the recording mechanism arranged in the rear of the tank. When it is desired to empty the contents of the tank back into the main tank, the valves 125 are opened. As previously described, it is necessary that the discharge valve be in an entirely closed position with the flattened portion 130 of the cam in the position shown in Figure 8 of the drawings to permit the opening of the valves 125. If the discharge valve is open or partially open, the actuating lever 128 is prevented from moving by the cam 129 and it is therefore impossible to open the valve. The shaft 116 is provided with a handle 131 by means of which the shaft is oscillated and the valve 125 opened. This handle is provided with a locking pin 132 adapted to enter openings 133 in a thickened portion or a boss 134 formed on the casing. The pin is surrounded by a spring 135 to normally project it to engage the opening, and it is necessary that the pin be withdrawn against the tension of the spring to operate the valve 125. The valve 125 is retained on its seat by the spring 127 so that accidental opening of the auxiliary valve is prevented. In the operation of the discharge valve, the spring pressed arm 114 engages one of the six surfaces of the nut 113 in each of the six positions indicating the fully closed valve or open to discharge from 1 to 5 gallons. By providing the spring pressed arm adapted to engage one of the six surfaces, operation of the valve is facilitated as the arm is forced into engagement with each of the surfaces by the spring 117 and it is thus possible to readily ascertain whether the valve is in proper position without too closely watching the position of the opening 111 in the handle 108.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A fuel delivering system comprising a tank having an outlet opening, means for pumping fuel into said tank, a valve arranged over said outlet opening, said valve being provided with a plurality of openings, and stand pipes arranged over said openings, whereby fuel above the upper level of the stand pipe will be delivered through said outlet opening when one of the openings in said valve is arranged in alinement therewith, said valve being provided with a plurality of passages through which certain of said stand pipes will be emptied when another stand pipe is arranged in alinement with said outlet opening.

2. A fuel delivering system comprising a tank, means for delivering fuel to said tank, said tank being provided with a valve seat having an outlet opening, a valve movably mounted on said seat, said valve being provided with a plurality of openings, and stand pipes of different heights arranged over said openings whereby a desired number of units of fuel may be delivered from said tank by placing different stand pipes in alinement with the outlet opening, said valve being provided with a plurality of passages through which certain of said stand pipes will be emptied when another stand pipe is arranged in alinement with said outlet opening.

3. A fuel delivering system comprising a tank, means for delivering a predetermined quantity of fuel to said tank, said tank being provided with an outlet opening, a valve arranged over said outlet opening, said valve being provided with a plurality of openings, stand pipes of different heights arranged over said openings whereby a desired number of units of fuel may be delivered from said tank by placing a predetermined stand pipe in alinement with the outlet opening, and means for independently emptying certain of stand pipes when another stand pipe is arranged in alinement with the outlet opening.

4. A fuel delivering system comprising a tank, means for delivering a predetermined quantity of fuel to said tank, said tank being provided with an outlet opening, a valve arranged over said outlet opening, said valve being provided with a plurality of openings, and stand pipes of different heights arranged over said openings whereby a desired number of units of fuel may be delivered from said tanks by placing a predetermined stand pipe in alinement with the outlet opening, said valve being provided with passages extending from the bottom of the stand pipes and passing through the valve at varying distances from the center, said valve seat being provided with a plurality of sets of concentric openings adapted to register with the ends of said passages when the valve is in certain positions.

5. A fuel delivering system comprising a tank, means for filling said tank, an outlet valve arranged in said tank, an operating shaft connected to said valve, a cam arranged on said shaft, an auxiliary valve to permit draining of said tank, and a pivoted member arranged between said shaft and said auxiliary valve, said pivoted member being provided with a pair of oppositely extending arms, one of said arms being adapted to contact with said auxiliary valve to open it, the other of said arms being arranged adjacent said cam, said cam being provided with a flattened portion arranged adjacent said last named arm when said outlet valve is closed to permit operation of said pivoted member.

6. A fuel delivering system comprising a tank, means for filling said tank, an outlet valve arranged in said tank, an operating shaft connected to said valve, a cam arranged on said shaft, an auxiliary valve to permit draining of said tank, a rock shaft arranged between said operating shaft and said auxiliary valve, a collar carried by said rock shaft, and a pair of oppositely extending arms carried by said collar, one of said arms being adapted to contact with said auxiliary valve to open it when said rock shaft is operated, the other of said arms being arranged adjacent, and adapted to contact with, said cam, said cam being provided with a flattened portion adapted to be arranged adjacent said second named arm when said outlet valve is in closed position to permit operation of said rock shaft.

In testimony whereof, I affix my signature.

HENRY KERSHAW.